July 5, 1938.  J. SIMEONE  2,122,663
TREE BALL BINDER
Filed Oct. 16, 1937
Fig. 1
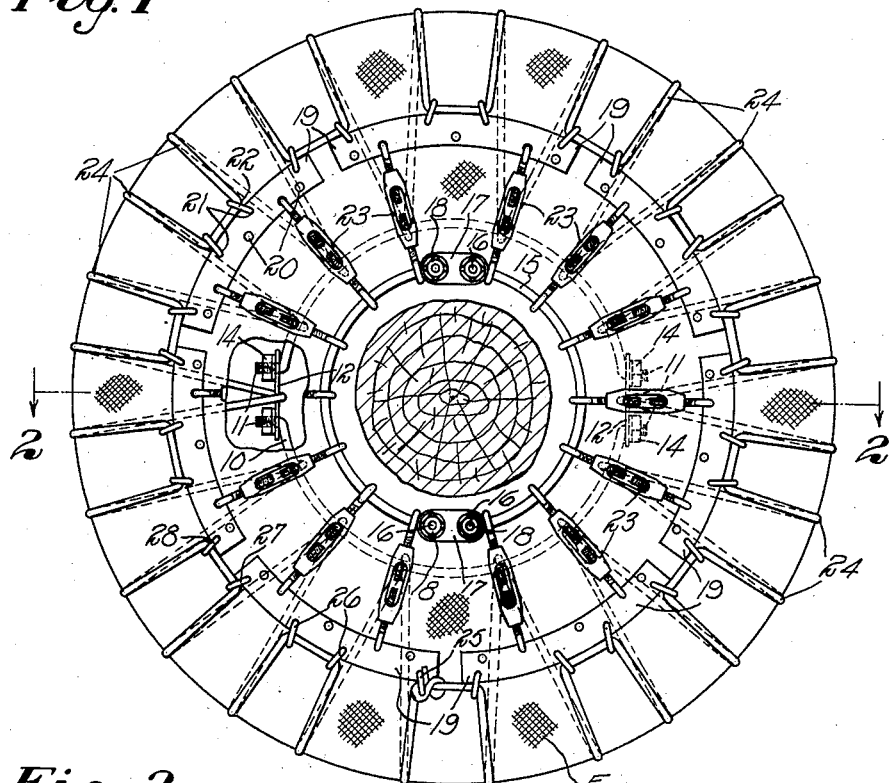
Fig. 2
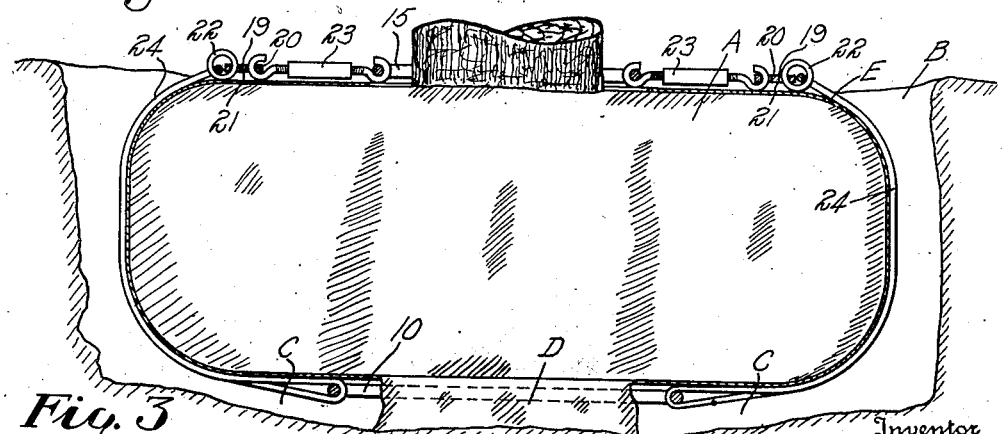
Fig. 3
Inventor
JOHN SIMEONE
By N. Clay Lindsey,
Attorney Patented July 5, 1938

2,122,663

UNITED STATES PATENT OFFICE 2,122,663

TREE BALL BINDER

John Simeone, Hartford, Conn.

Application October 16, 1937, Serial No. 169,391

5 Claims. (Cl. 55—119)

The present invention relates to an improved apparatus for use in tree transplanting and to the method of preparing a tree for transplanting. It is necessary, in the transporting of trees, to form a compact ball or core of dirt around the extending roots and so secure the core as to form a substantially integral mass. It is also essential that this mass remain solid throughout the transportation of the tree in order to prevent the drying out of the earth surrounding the roots.

An object of the present invention is an apparatus which enables the wrapping of the core and the securing of same to place it under compression to maintain the mass solid while the tree is still standing.

A further object is an apparatus which permits tensioning of the securing apparatus to obtain an even distribution of pressure throughout the mass at any time during the transplanting of the tree.

A still further object is an apparatus which may be readily adjustable to various sizes of trees and which flexibly adjusts itself to the contour of the ball or core.

Another object is an improved method of preparing the tree for transplanting whereby the ball or core of earth is wrapped and placed under compression prior to the lifting of the tree from the ground.

Other objects will be in part obvious and in part pointed out more in detail hereinafter.

The invention accordingly consists in the features of construction, combination of elements, and arrangement of parts which will be exemplified in the construction hereafter set forth and the scope of the application of which will be indicated in the appended claims.

In the accompanying drawing which illustrates one embodiment which the present invention may take:

Figure 1 is a plan view of the invention with the upper reaches of the tree omitted;

Fig. 2 is a section on line 2—2 of Fig. 1; and

Fig. 3 is a detail view of a securing device used in the apparatus.

Referring to the drawing, a ball or core A is formed by digging out the earth to form a circumferential trench B spaced at sufficient distance from the tree trunk, which distance depends upon the size of tree being uprooted, and then tunnelling under the ball, as at C, until the core A rests on a minimum foundation D. The exposed area of the core A between the trunk of the tree and the foundation D is then wrapped in a suitable fabric E. The trench must be of sufficient size to permit a workman to move therein and place the apparatus as hereinafter described.

This apparatus comprises a bottom ring or member 10 which is locked together in any suitable way. The ring shown has outturned threaded studs 11 adapted to receive locking bars or braces 12 secured thereon by nuts 14. There is further provided a top ring 15 which is also made of sections locked together in any suitable way. The ring shown has upstanding studs 16 adapted to receive locking bars or braces 17, which braces are secured in place by nuts 18. With the top and bottom rings made in sections as described, it is apparent that they may be readily placed around the foundation D and the trunk of the tree while the tree remains in position. There is further provided a plurality of segmental plates 19 disposed circumferentially around the core and spaced outwardly from top ring 15, thus lying intermediate of the top and bottom rings. The plates 19 are provided along their inner edge with openings 20 and their outer edge with openings 21 in which are rings 22 loosely mounted. Interconnecting the top ring 15 and the segmental plates 19 are a plurality of turn buckles 23 having one end pivotally mounted on the top ring 15 and the other pivotally connected in one of the openings 20 of the plates 19. The apparatus is completed by interconnecting the segmental plates 19 and the bottom ring 10 with the flexible line 24, which line may be of rope, wire, or any other suitable material which will readily adjust itself to the contour of the core. It will be observed that the line 24 starts at ring 25 in one of the segmental plates; is then passed downwardly around the core and around ring 10; then upwardly and through two adjacent rings 26 carried by the plate; again downwardly and around a ring 10; and then upwardly and through an end ring 27 of the segmental plate. The line is then passed through an end ring 28 of the next segmental plate, and so on around the core until the free end again reaches ring 25 where it is secured after placing as much tension as possible thereon.

By so interconnecting the segmental plates and the bottom ring, the line 24 serves to make with the plates 19 a complete circle, thus spacing and maintaining the segmental plates 19 in proper circumferential relationship to the top and bottom rings.

In preparing large trees for transplanting after the wrapping E has been placed about the core, the bottom ring 10 may be placed in position about the periphery of the foundation D. It is apparent that the top ring 15, turn buckle 23, and segmental plates 19 may always be kept assembled and, by removing one top brace 17 and slacking off the other, the sections may be spread and placed around the trunk of the three and then secured in place. With the segmental plate 19 so secured, the line 24 may be interwoven between the bottom ring 10 and through the rings 22 of the segmental plates 19 and made as taut as possible and then secured, as at 25. When so secured, the entire mass or ball may be placed under compression by adjusting the turn buckles 23, and, in so adjusting, the plates 19, being pivotally mounted both on the turn buckle 23 and rings 22, will adjust themselves to the contour of the core, thus assuring an equal distribution of pressure throughout the core. With the apparatus so secured, it is apparent that bottom ring 10, line 24, and rings 22 will bite into the fabric and hold it securely in place, and, as the tension is increased, any slack which may have been in the fabric will be taken up. With the ball or core so secured, an upward lift may be put on the tree to lift it bodily from the trench. If at any time during transportation the core A shows signs of shrinkage or due to changes therein caused by handling, the turn buckle 23 may be further manipulated to place the ball under proper compression. With a plurality of turn buckles, it is apparent that but a slight strain on each will create a tremendous pressure. However, as they are evenly distributed, the resultant pressure will be equalized throughout the apparatus and the core.

Fig. 3 is a detailed view of a suitable brace adapted to secure the sections of the rings together and comprises a segmental member 30 having a plurality of openings 31 therethrough to receive studs 11 or 16 of the top and bottom rings. The various openings allow for adjustment of the rings, depending upon the size of the tree being moved.

It is apparent that the apparatus may be used on trees varying widely in size, inasmuch as the spacing between the rings 10 and the segmental plates 19 is of such extent that the line 24 will take up any difference therebetween and the circumferential size varied by removing one or more of the segmental plates 19.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a device of the character described, top and bottom rings, a plurality of segmental holding members intermediate of the rings, flexible means interconnecting one ring with said members, and adjustable tensioning means securing the other ring with said members.

2. In a device of the character described, a top sectional ring, means for integrally securing said sections, a bottom sectional ring, means for integrally securing said sections, a plurality of rigid segmental holding members intermediate of the rings, flexible means interconnecting the bottom ring and segments, and adjustable tensioning means interconnecting the top ring and segments.

3. In a device of the character described, a top sectional ring, locking means for said ring, a bottom sectional ring, locking means for said bottom ring, a plurality of segmental plates adjacent said top rings, adjustable means interconnecting said top rings and plate, and flexible means securing said plate and bottom rings.

4. In a device of the character described, a sectional top ring, means for integrally securing the sections, a plurality of segmental plates spaced from the top ring, a plurality of turn buckles interconnecting the plates and top ring, a sectional bottom ring, means for integrally securing the sections, and a flexible line interconnecting the segmental plates and the bottom ring.

5. In a device of the character described, a sectional top ring, securing means for said sections, a plurality of segmental flat plates spaced from said ring and circumferentially disposed relative thereto, said plates having a plurality of vertical openings adjacent the inner and outer edges thereof, a plurality of rings rotatably carried in the outer openings of the plate, a bottom sectional ring, securing means for said sections, a flexible line adapted to be alternately passed through said plate rings and around said bottom ring to interconnect said plates and bottom rings, a plurality of turn buckles having one end pivotally mounted on said top ring and the other end to the inner edges of the plates whereby when tension is applied said device will adjust itself to the required contour.

JOHN SIMEONE.